US012689956B2

(12) United States Patent
Sheikh et al.

(10) Patent No.: US 12,689,956 B2
(45) Date of Patent: Jul. 21, 2026

(54) PRIORITIZED RETURN TO RAT NR FROM RAT GSM / RAT UMTS THROUGH RAT RESELECTION BASED APPROACH

(71) Applicant: Apple Inc., Cupertino, CA (US)

(72) Inventors: Parvez Sheikh, Bengaluru (IN); Bernd H. Kemmer, Eichenau (DE); Prasad P. Ashtekar, Haar (DE); Deepak Dash, Bangalore (IN); Nitin Kuppelur, Bangalore (IN)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 18/367,803

(22) Filed: Sep. 13, 2023

(65) Prior Publication Data

US 2024/0107405 A1 Mar. 28, 2024

Related U.S. Application Data

(60) Provisional application No. 63/407,427, filed on Sep. 16, 2022.

(51) Int. Cl.
*H04W 36/00* (2009.01)
*H04W 36/08* (2009.01)
*H04W 84/04* (2009.01)

(52) U.S. Cl.
CPC ....... *H04W 36/08* (2013.01); *H04W 36/0085* (2018.08); *H04W 84/042* (2013.01)

(58) Field of Classification Search
CPC .......................... H04W 36/08; H04W 36/0085; H04W 84/042
See application file for complete search history.

(56) References Cited

U.S. PATENT DOCUMENTS

| | | | | |
|---|---|---|---|---|
| 12,550,202 B2 * | 2/2026 | Choe | ...................... | H04W 76/10 |
| 2008/0014957 A1 * | 1/2008 | Ore | ................... | H04W 36/0088 |
| | | | | 455/452.1 |

(Continued)

FOREIGN PATENT DOCUMENTS

WO WO-2020076934 A1 * 4/2020 ......... H04L 65/1016

OTHER PUBLICATIONS

International Search Report and Written Opinion directed to related International Application No. PCT/US2023/032926, mailed Jan. 3, 2024, 10 pages.

(Continued)

*Primary Examiner* — Khai M Nguyen
(74) *Attorney, Agent, or Firm* — Sterne, Kessler, Goldstein & Fox P.L.L.C.

(57) ABSTRACT

Disclosed herein are system, method, and computer program product embodiments for implementing prioritized return of a UE to NR RAT from a GSM/UMTS RAT through RAT reselection based approach. An embodiment operates by determining whether the UE is camped on a first radio access technology (RAT), and in response to a determination that the UE is camped on the first RAT, stores a list of frequencies and a plurality of cell reselection parameter values corresponding to the first RAT. The embodiment determines whether the UE is camped on a second RAT and whether one of a plurality of trigger conditions is satisfied, and in response to a determination that the UE is camped on the second RAT and that one of the plurality of trigger conditions is satisfied, performs measurements on one or more frequencies of the list of frequencies. The embodiment performs cell reselection to a cell of the first RAT based at least in part on the measurements and the plurality of cell reselection parameter values.

20 Claims, 6 Drawing Sheets

500

Determine whether the UE is camped on a first radio access technology (RAT) — 502

In response to determination that the UE is camped on the first RAT, store a list of frequencies and a plurality of cell reselection parameter values corresponding to the first RAT — 504

Determine whether the UE is camped on a second RAT and one of a plurality of trigger conditions is satisfied — 506

In response to a determination that the UE is camped on the second RAT and one of the plurality of trigger conditions are satisfied, perform measurements on one or more frequencies of the list of frequencies — 508

Perform cell reselection to a cell of the first RAT based at least in part on the measurements and the plurality of cell reselection parameter values — 510

(56) References Cited

U.S. PATENT DOCUMENTS

| | | | |
|---|---|---|---|
| 2016/0127956 A1* | 5/2016 | Jujaray | ................ H04W 48/16 |
| | | | 455/437 |
| 2020/0053602 A1* | 2/2020 | Kadiri | .................... H04W 4/80 |
| 2021/0076264 A1* | 3/2021 | Zhang | .............. H04W 36/0085 |
| 2021/0274559 A1* | 9/2021 | Hwang | ................ H04W 24/10 |
| 2022/0408393 A1 | 12/2022 | Viswanath et al. | |
| 2025/0212078 A1* | 6/2025 | Gu | ........................ H04W 36/30 |

OTHER PUBLICATIONS $3^{rd}$ Generation Partnership Project; Technical Specification Group Services and System Aspects; Single Radio Voice Call Continuity (SRVCC); Stage 2 (Release 17), 3GPP TS 23.216 V17.1.0, 78 pages, Jun. 2022.

* cited by examiner

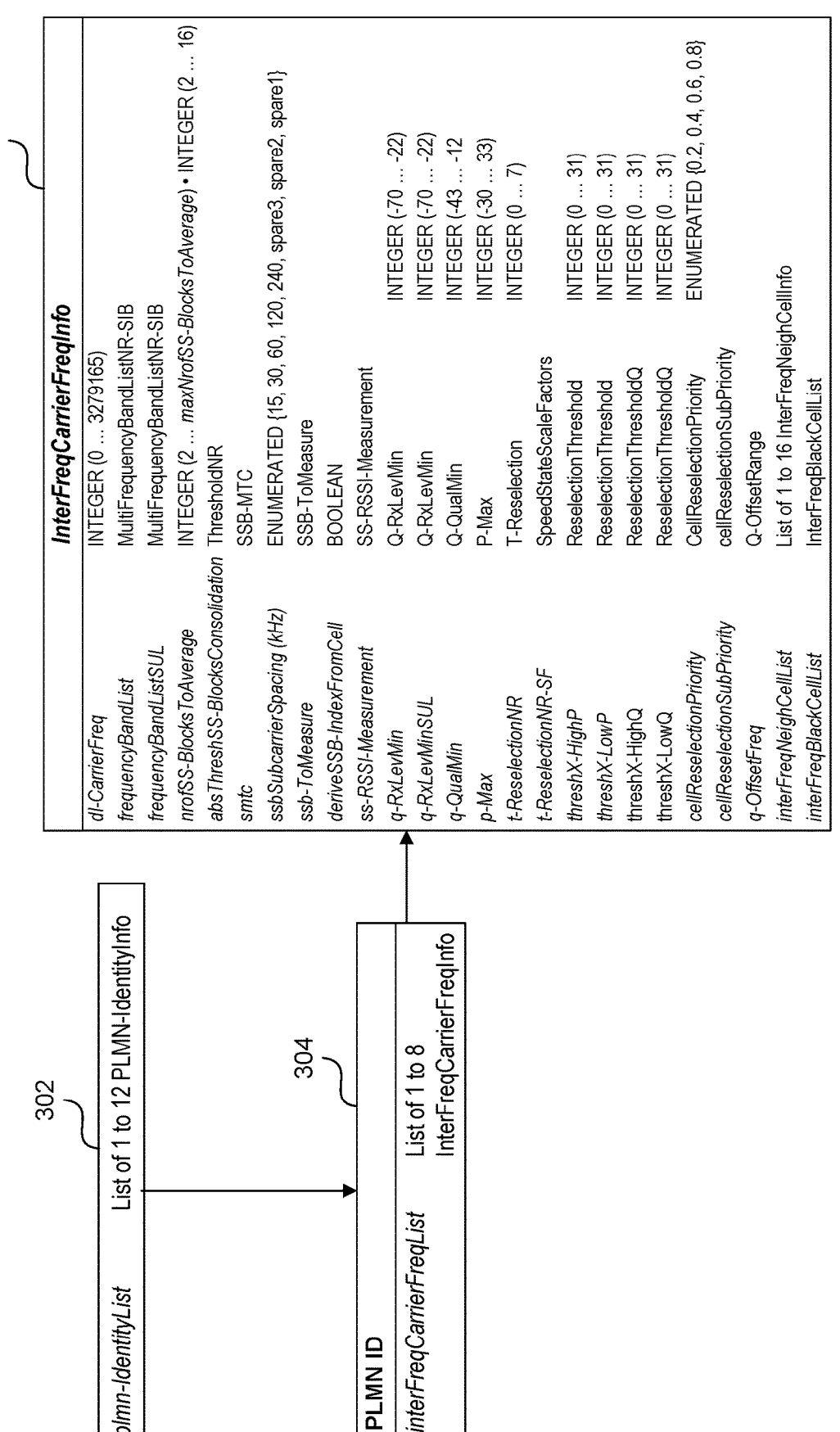

302 plmn-IdentityList     List of 1 to 12 PLMN-IdentityInfo

304

| PLMN ID | |
| --- | --- |
| interFreqCarrierFreqList | List of 1 to 8 InterFreqCarrierFreqInfo |

306

| InterFreqCarrierFreqInfo | |
| --- | --- |
| dl-CarrierFreq | INTEGER (0 ... 3279165) |
| frequencyBandList | MultiFrequencyBandListNR-SIB |
| frequencyBandListSUL | MultiFrequencyBandListNR-SIB |
| nrofSS-BlocksToAverage | INTEGER (2 ... maxNrofSS-BlocksToAverage) • INTEGER (2 .... 16) |
| absThreshSS-BlocksConsolidation | ThresholdNR |
| smtc | SSB-MTC |
| ssbSubcarrierSpacing (kHz) | ENUMERATED {15, 30, 60, 120, 240, spare3, spare2, spare1} |
| ssb-ToMeasure | SSB-ToMeasure |
| deriveSSB-IndexFromCell | BOOLEAN |
| ss-RSSI-Measurement | SS-RSSI-Measurement |
| q-RxLevMin | INTEGER (-70 ... -22) |
| q-RxLevMinSUL | INTEGER (-70 ... -22) |
| q-QualMin | INTEGER (-43 ... -12) |
| p-Max | INTEGER (-30 ... 33) |
| t-ReselectionNR | INTEGER (0 ... 7) |
| t-ReselectionNR-SF | SpeedStateScaleFactors |
| threshX-HighP | ReselectionThreshold | INTEGER (0 ... 31) |
| threshX-LowP | ReselectionThreshold | INTEGER (0 ... 31) |
| threshX-HighQ | ReselectionThresholdQ | INTEGER (0 ... 31) |
| threshX-LowQ | ReselectionThresholdQ | INTEGER (0 ... 31) |
| cellReselectionPriority | CellReselectionPriority |
| cellReselectionSubPriority | cellReselectionSubPriority |
| q-OffsetFreq | Q-OffsetRange | ENUMERATED {0.2, 0.4, 0.6, 0.8} |
| interFreqNeighCellList | List of 1 to 16 InterFreqNeighCellInfo |
| interFreqBlackCellList | InterFreqBlackCellList |

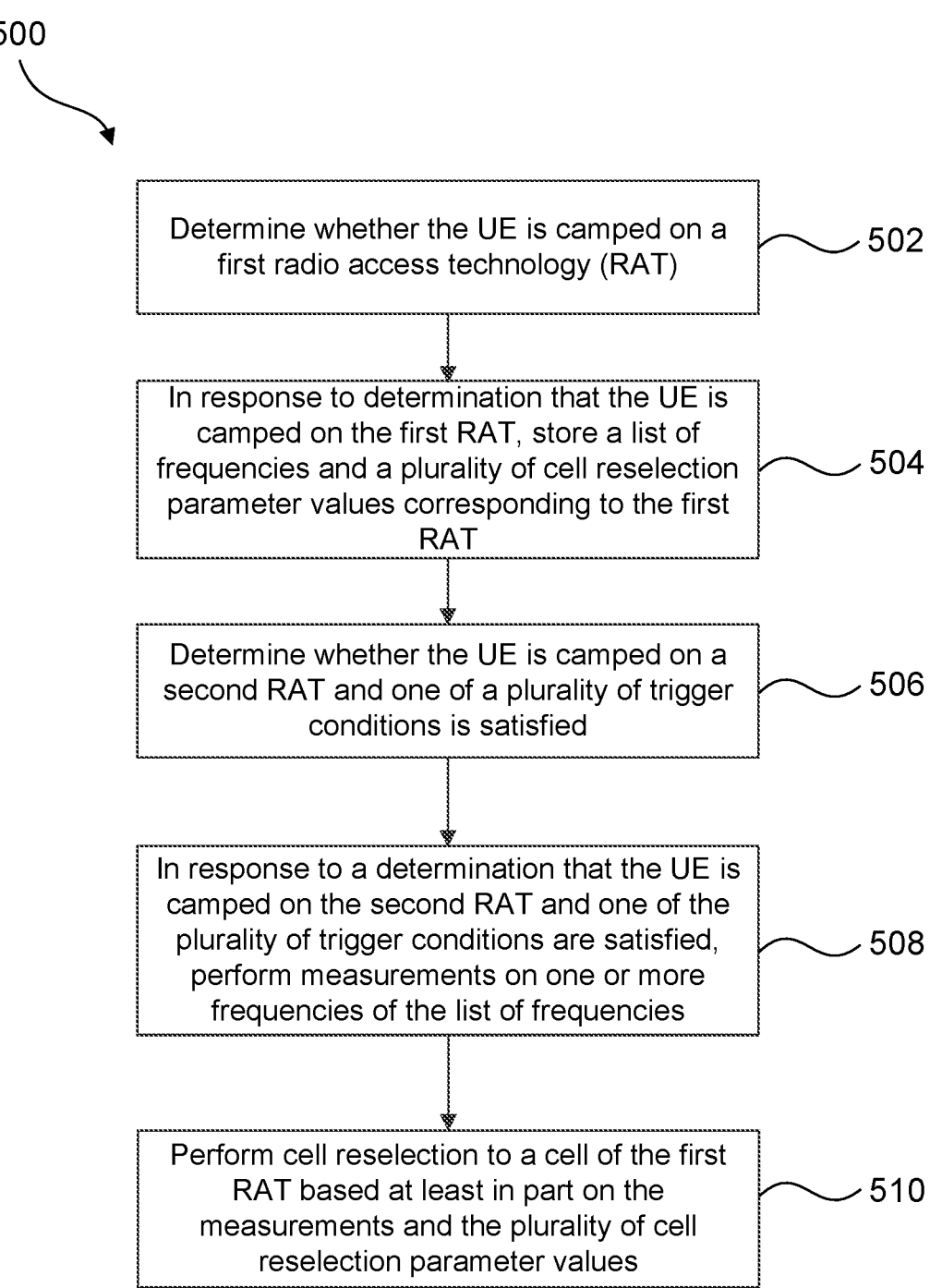

Determine whether the UE is camped on a first radio access technology (RAT) — 502

In response to determination that the UE is camped on the first RAT, store a list of frequencies and a plurality of cell reselection parameter values corresponding to the first RAT — 504

Determine whether the UE is camped on a second RAT and one of a plurality of trigger conditions is satisfied — 506

In response to a determination that the UE is camped on the second RAT and one of the plurality of trigger conditions are satisfied, perform measurements on one or more frequencies of the list of frequencies — 508

Perform cell reselection to a cell of the first RAT based at least in part on the measurements and the plurality of cell reselection parameter values — 510

FIG. 5

PRIORITIZED RETURN TO RAT NR FROM RAT GSM / RAT UMTS THROUGH RAT RESELECTION BASED APPROACH

CROSS REFERENCES

This application claims the benefit of U.S. Provisional Application No. 63/407,427 filed Sep. 16, 2022, titled "PRIORITIZED RETURN TO RAT NR FROM RAT GSM/RAT UMTS THROUGH RAT RESELECTION BASED APPROACH," the content of which is herein incorporated by reference in its entirety.

BACKGROUND

Field

The described aspects generally relate to mechanisms for inter-RAT (radio access technology) cell reselection in a wireless communication system.

Related Art

A user equipment (UE) can support several types of RATs, such as 5G new radio (NR), long-term evolution (LTE), universal mobile telecommunications system (UMTS), and global system for mobile communications (GSM). Cell reselection is a mechanism used for UE mobility in idle and inactive states. The UE can perform signal strength measurements of cells in one or more inter-RAT frequencies in order to perform cell reselection to a cell whose signal strength meets certain cell selection criteria.

SUMMARY

Some aspects of this disclosure relate to apparatuses and methods for prioritized return of a UE to NR RAT from a GSM RAT or a UMTS RAT. For example, some aspects of this disclosure relate to apparatuses and methods for performing cell reselection from a GSM/UMTS RAT to an NR RAT using a list of NR frequencies stored in a measurement database.

Some aspects of this disclosure relate to an apparatus having a memory and a processor coupled to the memory. The processor is configured to determine whether a UE is camped on a first radio access technology (RAT), and in response to a determination that the UE is camped on the first RAT, store a list of frequencies and a plurality of cell reselection parameter values corresponding to the first RAT. The processor is further configured to determine whether the UE is camped on a second RAT and whether one of a plurality of trigger conditions is satisfied. In response to a determination that the UE is camped on the second RAT and that one of the plurality of trigger conditions is satisfied, the processor is configured to perform measurements on one or more frequencies of the list of frequencies, and perform cell reselection to a cell of the first RAT based at least in part on the measurements and the plurality of cell reselection parameter values.

The processor can be further configured to store an identity of a last-serving public land mobile network (PLMN) when the UE is camped on the first RAT, and determine whether a PLMN selected when the UE is camped on the second RAT is same as the last-serving PLMN. In response to a determination that the PLMN selected when the UE is camped on the second RAT is same as the last-serving PLMN, the processor is configured to determine that a trigger condition of the plurality of trigger conditions is satisfied. The processor can be further configured to determine whether the PLMN selected when the UE is camped on the second RAT is an equivalent PLMN of the last-serving PLMN. In response to a determination that the PLMN selected when the UE is camped on the second RAT is an equivalent PLMN of the last-serving PLMN, the processor is configured to determine that a trigger condition of the plurality of trigger conditions is satisfied. The processor is further configured to determine whether the first RAT is a highest priority RAT of the UE for cell reselection. In response to a determination that the first RAT is the highest priority RAT of the UE for cell reselection, the processor is configured to determine that a trigger condition of the plurality of trigger conditions is satisfied. According to some aspects, in response to the determination that the UE is camped on the first RAT, the processor is configured to store, in a database, information received in one or more of a system information block (SIB) 1, a SIB 2, and a SIB 4. According to some aspects, one or more of a list of PLMN identities, the list of frequencies, and the plurality of cell reselection parameter values are stored in the database.

The processor can be further configured to perform, using a physical layer function of the UE, the measurements on the one or more frequencies of the stored list of frequencies in response to the determination that the UE is camped on the second RAT and one of the plurality of trigger conditions is satisfied, access the stored list of frequencies from the database using a non-access stratum (NAS) layer function of the UE. The processor is further configured to determine whether a frequency of the stored list of frequencies satisfies a cell reselection criterion, wherein the frequency of the stored list of frequencies corresponds to the cell of the first RAT. In response to a determination that the frequency of the stored list of frequencies satisfies the cell reselection criterion, the processor is configured to perform cell reselection to the cell of the first RAT, using a radio resource control (RRC) layer function of the UE corresponding to the second RAT. According to some aspects, the first RAT is a New Radio (NR) RAT. According to some aspects, the second RAT is universal mobile telecommunications system (UMTS) RAT or global system for mobile communications (GSM) RAT.

Some aspects of this disclosure relate to a method that includes determining whether a UE is camped on a first radio access technology (RAT), and in response to a determination that the UE is camped on the first RAT, storing a list of frequencies and a plurality of cell reselection parameter values corresponding to the first RAT. The method further includes determining whether the UE is camped on a second RAT and whether one of a plurality of trigger conditions is satisfied. In response to determining that the UE is camped on the second RAT and one of the plurality of trigger conditions is satisfied, performing measurements on one or more frequencies of the list of frequencies, and performing cell reselection to a cell of the first RAT based at least in part on the measurements and the plurality of cell reselection parameter values.

The method can further include storing an identity of a last-serving public land mobile network (PLMN) when the UE is camped on the first RAT, and determining whether a PLMN selected when the UE is camped on the second RAT is same as the last-serving PLMN. In response to determining that the PLMN selected when the UE is camped on the second RAT is same as the last-serving PLMN, determining that a trigger condition of the plurality of trigger conditions is satisfied. The method further includes determining whether the first RAT is a highest priority RAT of the UE for cell reselection, and in response to a determination that the first RAT is the highest priority RAT of the UE for cell reselection, determining that a trigger condition of the plurality of trigger conditions is satisfied. The method further includes, storing, in a database, information received in one or more of a system information block (SIB) 1, a SIB 2, and a SIB 4 in response to the determination that the UE is camped on the first RAT.

The method can further include, in response to the determination that the UE is camped on the second RAT and one of the plurality of trigger conditions is satisfied, accessing the stored list of frequencies from the database using a non-access stratum (NAS) layer function of the UE, and performing, using a physical layer function of the UE, the measurements on the one or more frequencies of the stored list of frequencies. The method can further include determining whether a frequency of the stored list of frequencies satisfies a cell reselection criterion, wherein the frequency of the stored list of frequencies corresponds to the cell of the first RAT. In response to a determination that the frequency of the stored list of frequencies satisfies the cell reselection criterion, performing cell reselection to the cell of the first RAT, using a radio resource control (RRC) layer function of the UE corresponding to the second RAT.

Some aspects of this disclosure relate to a non-transitory computer-readable medium storing instruction that, when executed by a processor of a UE, cause the processor to perform operations including determining whether the UE is camped on a first radio access technology (RAT), and in response to a determination that the UE is camped on the first RAT, storing a list of frequencies and a plurality of cell reselection parameter values corresponding to the first RAT. The operations further include determining whether the UE is camped on a second RAT and whether one of a plurality of trigger conditions are satisfied. In response to a determination that the UE is camped on the second RAT and that one of the plurality of trigger conditions is satisfied, performing measurements on one or more frequencies of the list of frequencies, and performing cell reselection to a cell of the first RAT based at least in part on the measurements and the plurality of cell reselection parameter values.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an exemplary measurement database of an electronic device implementing prioritized return of a UE to NR RAT from a 2G RAT or 3G RAT, according to some aspects of the disclosure.

FIG. 5 illustrates an exemplary method performed by a UE implementing prioritized return to NR RAT from a 2G/3G RAT, according to some aspects of this disclosure.

Figure 1:
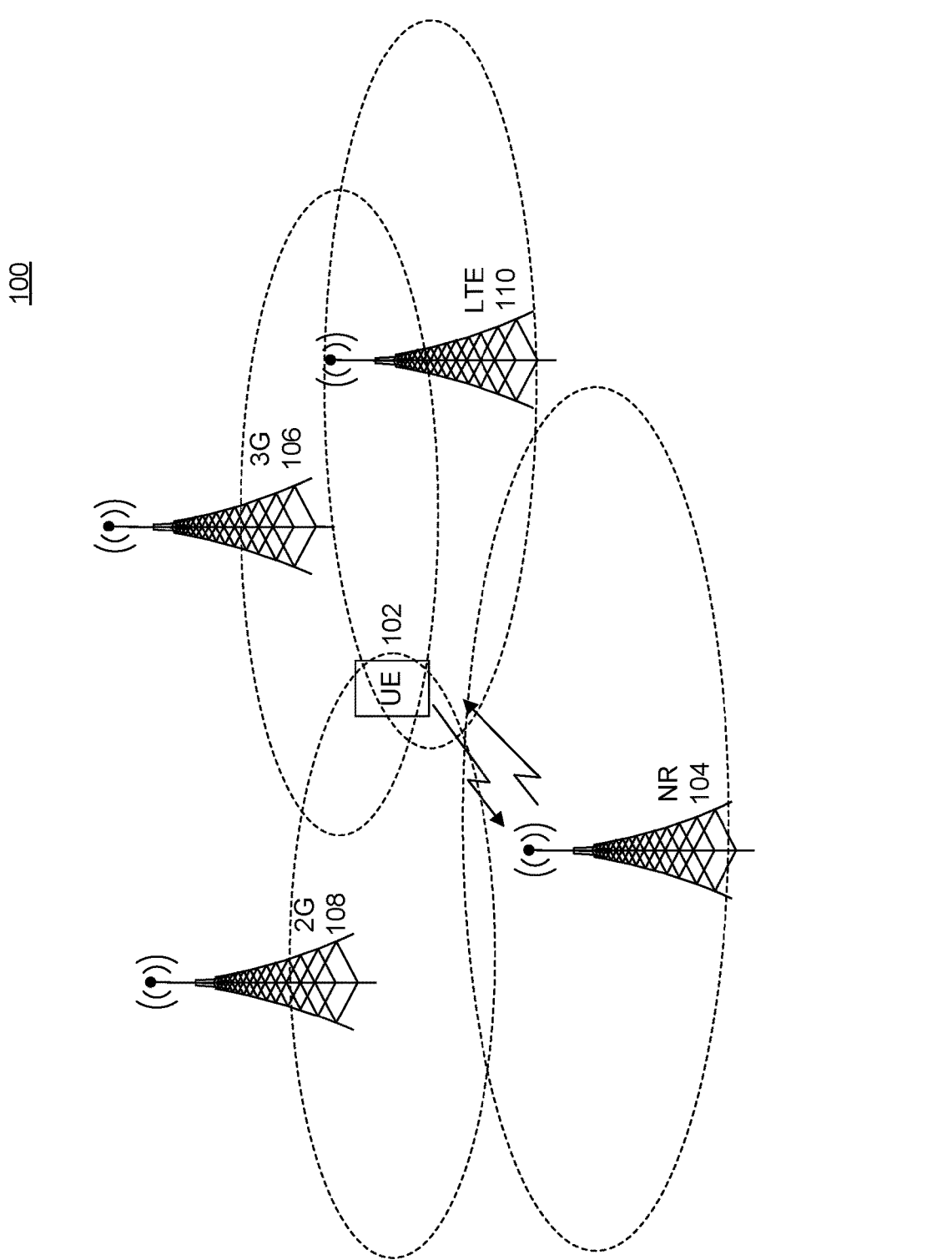
FIG. 1 illustrates an example wireless system implementing prioritized return of a UE to NR RAT from a 2G RAT/3G RAT, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing mechanisms for inter-Radio Access Technology (RAT) cell reselection. A UE performing inter-RAT cell reselection can be a multi-mode UE that includes multiple transceivers for communicating over wireless networks of different cellular radio technologies. For example, a UE may include capabilities to support multiple RATs such as 5G new radio (NR), long-term evolution (LTE), universal mobile telecommunications system (UMTS), and global system for mobiles (GSM), Bluetooth, and Wi-Fi.

A UE in an idle mode executes a cell reselection procedure to move from a cell that it is camped on to another cell. An inter-RAT cell reselection involves a UE executing cell reelection from a cell of a first RAT to a cell of a second RAT.

A UE that is camped on a cell of NR RAT may, under certain circumstances, move from the NR RAT to a cell of a 2G RAT (e.g., GSM RAT, GSM edge radio access network (GERAN)) or a 3G RAT (e.g., UMTS RAT). Since the NR RAT offers the highest quality of service, it would be advantageous for the UE to move back from the 2G or 3G RAT to the NR RAT at the earliest possible time. A UE that is camped on a 2G or 3G RAT can transition to a cell of NR RAT through non-access stratum (NAS) based cell selection or through an indirect reselection by transitioning from a 2G or 3G RAT to an LTE RAT, and subsequently transitioning from the LTE RAT to NR RAT. However, the cell selection based return to NR and the indirect reselection based return to NR RAT are suboptimal approaches that involve substantial delay and do not provide the best quality of service to the user. Furthermore, existing 3GPP standards do not support any reselection mechanism for the UE to transition directly from a 2G or 3G RAT to NR RAT.

Embodiments herein provide an efficient access stratum (AS) based mechanism for a UE to return to NR RAT from a 2G or 3G RAT.

FIG. 1 illustrates an example wireless system 100 implementing prioritized return of a UE to NR RAT from a 2G RAT or 3G RAT, according to some aspects of the disclosure. Example wireless system 100 is provided for the purpose of illustration only and does not limit the disclosed aspects. Wireless system 100 may include, but is not limited to, a base station 104, a base station 106, a base station 108, base station 110, and a user equipment 102.

According to some aspects, base station 104, base station 106, base station 108, and base station 110 can be a fixed station or a mobile station. Base station 104, base station 106, base station 108, and base station 110 may be referred to as a base transceiver system (BTS), an access point (AP), a transmission/reception point (TRP), an evolved NodeB (eNB), a next generation node B (gNB), a 5G node B (NB), or some other equivalent terminology. In some examples, base station 104, base station 106, and base station 108 can be interconnected to one another and/or to other base station or network nodes in a network through various types of backhaul interfaces such as a direct physical connection, a virtual network, and/or the like, not shown.

According to some aspects, UE 102 can be a multi-mode UE that is capable of supporting multiple RATs. UE 102 can be stationary or mobile. UE 102 can be a cellular phone (e.g., a smart phone), a personal digital assistant (PDA), a wireless modem, a wireless communication device, a hand-held device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufac- turing equipment, a global positioning system device, an Internet-of-Things (IoT) device, a machine-type communi- cation (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 102 may be capable of communicating with one or more base stations of the wireless system 100. According to some aspects, wireless system 100 may utilize one or more RATs. Wireless system 100 may have overlapping coverage from one or more RATs.

According to some aspects, base station 104 can be a NR base station. An NR RAN includes NR base station 104 and a new radio core network (NR CN). NR base station 104 can be a next generation node B (gNode B). UE 102 can access an external network via base station 104 and the NR CN.

According to some aspects, base station 106 can be a 3G base station (e.g., a UMTS base station). A UMTS terrestrial radio access network (UTRAN) includes UMTS base station 106, a radio network controller (RNC), and a core network (CN). UMTS base station 106 can be a node B. UE 102 can access an external network via base station 106, the RNC, and the CN.

According to some aspects, base station 108 is a 2G base station (e.g., a GSM base station). A GSM RAN includes base station 108, a base station controller (BSC), and network switching subsystem (NSS). A GSM base station 108 can be a base transceiver system (BTS). UE 102 can access an external network via base station 108, BSC, and NSS.

According to some aspects, base station 110 can be an LTE base station. An LTE RAN includes LTE base station 110 and a new radio core network (NR CN). LTE base station 110 can be an evolved generation node B (eNode B). UE 102 can access an external network via base station 110 and the NR CN.

According to some aspects, NR base station 104, 3G base station 106, 2G base station 108, and LTE base station 110 may be co-located. According to some aspects, NR base station 104, 3G base station 106, 2G base station 108, and LTE base station 110 may have overlapping coverage area. A base station may provide one or more cells. For example, a first base station may provide a serving cell to UE 102, and a second base station may provide a neighbor cell. Accord- ing to some aspects, a single base station may provide both a serving cell and one or more neighbor cells. According to some aspects, NR base station 104, LTE base station 110, 3G base station 106, and 2G base station 108 may be managed by the same public land mobile network (PLMN).

According to some aspects, base stations 104, 106, and 108 periodically broadcast a series of system information at regular intervals. Base stations 104, 106, and 108 can broadcast system information in system information blocks (SIBs) (e.g., system information block 1 (SIB 1), SIB 2, SIB 4). SIBs broadcasted by the base stations comprise infor- mation related to serving cell frequencies and inter-fre- quency neighbor cells relevant for cell reselection. SIBs also including cell reselection parameters common for a fre- quency and cell-specific reselection parameters. The UE 102 can perform signal strength measurements of cells in one or more inter-RAT frequencies in order to perform cell rese- lection to a cell whose signal strength meets certain cell selection criteria.

According to some aspects, UE 102 performs signal quality measurements in order to perform cell reselection. Cell reselection criteria can be evaluated based on one or more signal strength metrics or signal quality metrics obtained by UE 102. According to some aspects, signal strength metrics include received signal strength indicator (RSSI), received signal code power (RSCP), and reference signal received power (RSRP). According to some aspects, signal quality metrics include signal to interference plus noise ratio (SINR) and reference signal received quality (RSCP).

Figure 2:
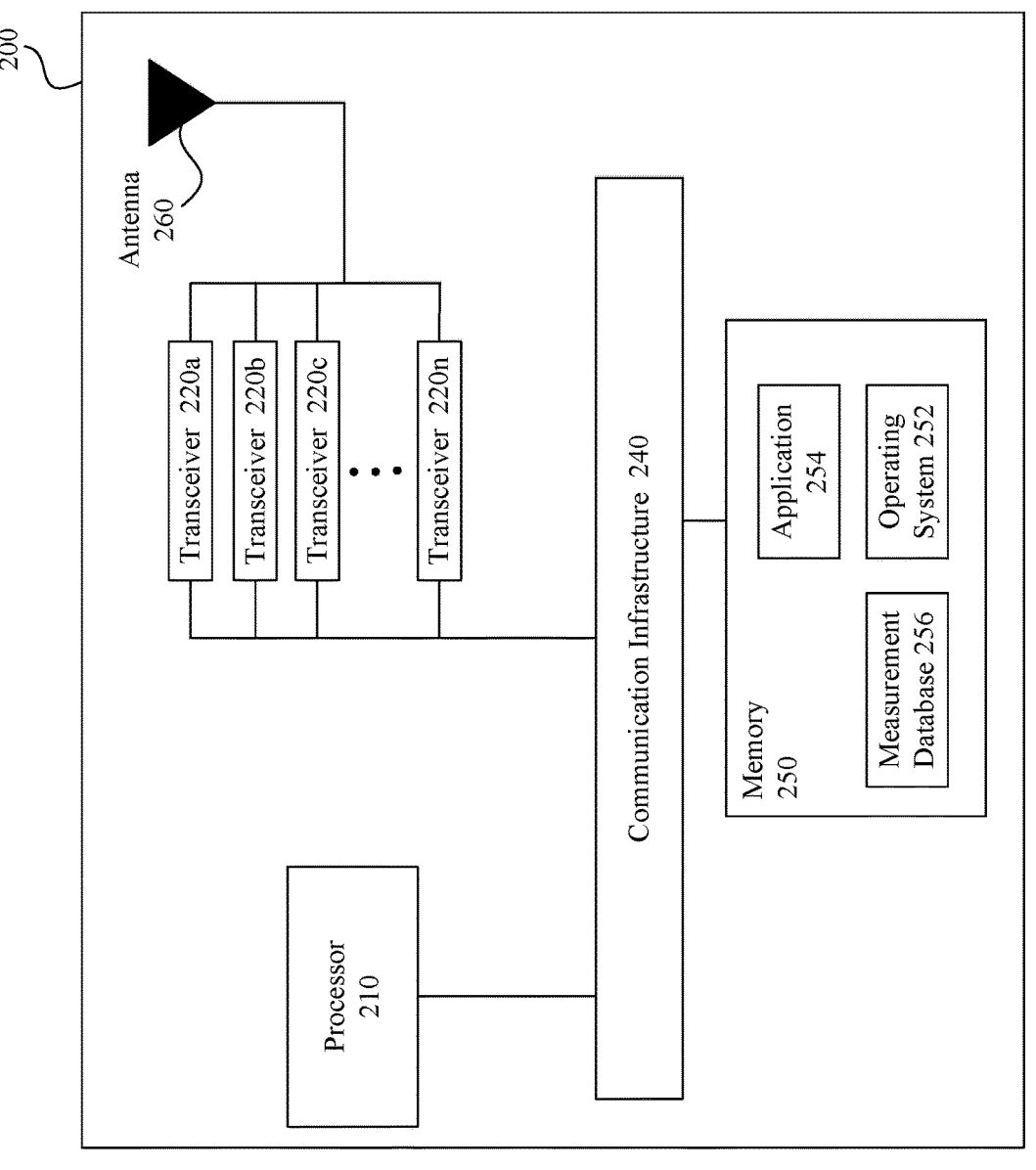
FIG. 2 illustrates a block diagram of an example system of an electronic device implementing prioritized return of a UE to NR RAT from a 2G/3G RAT, according to some aspects of the disclosure.

FIG. 2 illustrates a block diagram of an example system 200 of an electronic device implementing prioritized return of a UE to NR RAT from a 2G RAT or 3G RAT, according to some aspects of the disclosure. System 200 may be any of the base stations 101 or 107, and/or UE 103 of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. Accord- ing to some examples, operating system 252 can be stored in memory 250. Operating system 252 can manage transfer of data from memory 250 and/or one or more applications 254 to processor 210 and/or one or more transceivers 220a-220n. In some examples, operating system 252 main- tains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer. Memory 250 may include a measurement database 256. According got some aspects, measurement database 256 facilitates storing cell reselection parameters that can be used for executing cell reselection from 2G/3G RAT to NR RAT as described herein.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with computer instructions stored in memory 250 performs operations enabling system 200 of system 100 to implement prioritized return of UE 102 to NR RAT from a 2G RAT or 3G RAT, according to some aspects of the disclosure, as described herein. Alternatively, processor 210 can be "hard-coded" to implement prioritized return of a UE to NR RAT from a 2G RAT or 3G RAT, as described herein.

One or more transceivers 220a-220n transmit and receive communications signals that support getting UE 103 into service on a prioritized RAT after out-of-service detection, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, amplifiers, filters, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 2G, 3G, 4G, 5G networks such as GSM, UMTS, LTE, NR and the like. For example, one or more transceivers

220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220a-220n, implements cell selection procedure to get a UE into service on a prioritized RAT after out-of-service detection, as discussed herein. Alternatively, processor 210 can be "hard-coded" to implement cell reselection procedure for prioritized return of a UE to NR RAT from a 2G RAT or 3G RAT, as described herein.

FIG. 3 illustrates exemplary contents of a measurement database of an electronic device implementing prioritized return of a UE to NR RAT from a 2G/3G RAT, according to some aspects of the disclosure. Measurement database 256 can be stored in memory 250 of UE 102. According to some aspects, measurement database 256 facilitates storing frequency values and cell reselection parameters that can be used for executing cell reselection from 2G/3G RAT to NR RAT.

According to some aspects, measurement database 256 comprises a list of PLMN identities 302 that are broadcast by NR base station 104. According to some aspects, a PLMN identity consists of a Mobile Country Code (MCC) and a Mobile Network Code (MNC). According to some aspects, UE 102 may receive an equivalent PLMN (E-PLMN) list. The E-PLMN list can be signaled to UE 102 as part of the location area update, routing area update or attach procedures. An E-PLMN list can be included in the Location Updating Accept, Routing Area Updating Accept and Attach Accept messages. UE 102 adds the PLMN of the current network to the received E-PLMN list before storing it. The list of PLMNs in an equivalent PLMN list are treated as equivalent for the purposes of PLMN selection, cell selection/reselection and handover.

According to some aspects, for each PLMN listed in 302, measurement database 256 may include a corresponding list of frequencies 304. According to some aspects, the list of frequencies 304 includes a list InterFreqCarrierFreqList that provides up to eight InterFreqCarrierFreqInfo information element sets. Each InterFreqCarrierFreqInfo information element set contains neighboring carrier frequencies and frequency specific cell reselection information. Measurement database 256 may include an information element (IE) dl-CarrierFreq, which specifics the Absolute Frequency Channel Number (ARFCN) for the synchronization signal (SS)/physical broadcast channel (PBCH) of the inter-frequency neighbor cells. Measurement database 256 may include an IE frequencyBandList, which indicates a list of frequency bands for which the NR cell re-selection parameters apply.

According to some aspects, for each frequency listed in 304, measurement database 256 may include a list of reselection parameters 306. According to some aspects, database 256 may include a list of reselection parameters 306 that correspond to a set of frequencies. According to some aspects, measurement database may include an IE SS/PBCH block measurement timing configuration (smtc) that specifies measurement timing configuration for inter-frequency measurements. The measurement database may include an IE sbSubcarrierSpacing that defines the subcarrier specing of the SS/PBCH Blocks to be measure.

According to some aspects, reselection parameters 306 may include an IE dl-CarrierFreq, which specifies the ARFCN for the SS/PBCH belonging to the inter-frequency carrier. According to some aspects, reselection parameters 306 may include an IE frequencyBandList, which indicates a list of frequency bands for which the NR cell reselection parameters apply. According to some aspects, reselection parameters 306 may include an IE ssbSubcarrierSpacing, which indicates the subcarrier spacing of the SS/PBCH blocks. According to some aspects, reselection parameters 306 may include an IE Q-RxLevMin, which defines the minimum RSRP requirement for the target inter-frequency cell for reselection. Reselection parameters 306 may include an IE q-QualMin that defines the minimum RSQR requirement for the target inter-frequency cell.

According to some aspects, reselection parameters 306 may include an IE t-ReselectionNR that defines the time-to-trigger for inter-frequency reselection. According to some aspects, reselection parameters 306 may include an IE threshX-HighP, which is applicable during cell reselection when the target carrier has a higher absolute priority than the serving carrier. Cell reselection towards a higher priority cell may be permitted if Srxlev for the candidate cell is greater than the value of threshX-HighP. Reselection parameters 306 may include an IE threshX-HighQ, which is applicable during cell reselection when the target carrier has a higher absolute priority than the serving carrier. Cell reselection towards a higher priority cell may be permitted if Squal value for the candidate cell is greater than the value of threshX-HighQ.

According to some aspects, reselection parameters 306 may include an IE p-Max, which defines the maximum UE transmitted power permitted with in inter-frequency neighboring cells. The value of IE p-max may impact cell selection criteria if transmit power capability of a UE if below the value of p-max.

According to some aspects, reselection parameters 306 may include an IE CellReselectionPriority, which provides the absolute priority of the concerned carrier frequency and is used in the cell reselection procedure. A value 0 may mean lowest priority and value 7 may mean a highest priority. Reselection parameters 306 may include an IE cellReselectionSubPriority indicates a fractional value to be added to the value of cellReselectionPriority to obtain the absolute priority of the concerned carrier frequency for E-UTRA and NR.

According to some aspects, reselection parameters 306 may include an IE t-ReselectionNR, which defines the time-to-trigger for inter-frequency cell reselection. Additional IEs sf-High or sf-Medium define scaling factors for medium and high mobility. According to some aspects, reselection parameters 306 may include an IE interFreq-NeighCelList, which provides a set of cell specific parameters for cells belonging to the carrier defined by IE dl-CarrierFreq. Reselection parameters 306 may also include an IE intraFreqBlackCellList, which may specify up to 16 PCI ranges to be blacklisted.

Figure 4:
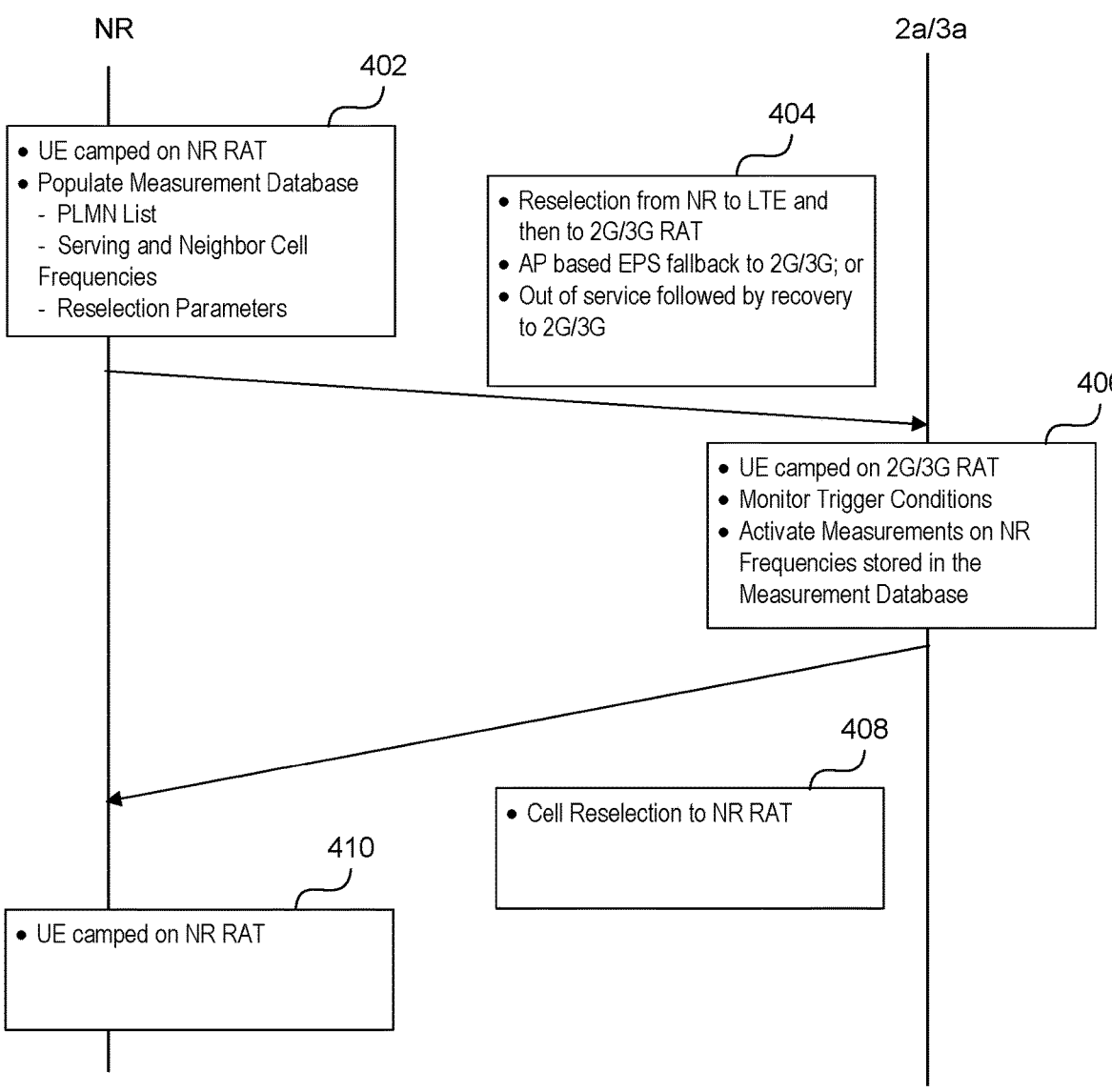
FIG. 4 illustrates an exemplary operations performed by a UE that transitions from NR RAT to a 2G/3G RAT and returns to NR RAT using an access stratum based cell reselection procedure, according to some aspects of this disclosure, according to some aspects of this disclosure.

FIG. 4 illustrates an exemplary operations performed by UE 102 that transitions from NR RAT to a 2G/3G RAT and returns to NR RAT using an access stratum based cell reselection procedure, according to some aspects of this disclosure. Method 300 can be performed by UE 102 as shown in FIGS. 1 and 2. For example, the functions of method 300 can performed by processor 210 or caused to be performed by processor 210 of UE 102.

At 402, UE 102 is camped on a cell of NR RAT. According to some aspects, UE 102 when camped on a cell of NR base station 104 receives system information block (SIB) broadcasts. For example, SIB 4 received by UE 102 from base station 104 comprises information regarding NR frequencies and inter-frequency neighbor cells relevant for cell reselection including cell reselection parameters common for a frequency and cell-specific reselection parameters, and SIB 2 received by UE 102 from base station 104 comprises cell reselection information related to the serving cell.

According to some aspects, UE 102 stores the system information it receives from NR base station 104 in measurement database 256. The system information stored in the measurement database can include the frequency values and cell reselection parameters described above with respect to FIG. 3. According to some aspects, UE 102 may populate measurement database 256 based on a determination that it is camped on a cell of NR RAT. According to some aspects, UE 102 may store its measurement database 256 in a local memory (e.g., in memory 250 of UE 102). According to some aspects, measurement database of UE 102 may be stored at a remote location (e.g., a remote server).

At 404, UE 102 moves from an NR cell implemented by NR BS 104 to a 3G cell (e.g., UTRAN) implemented by a 3G BS 106 or a 2G cell (e.g., GSM) implemented by a 2G BS 108 under various scenarios. For example, UE 102 may transition from a NR cell to an LTE cell implemented by an LTE BS 110 and subsequently transition from the LTE cell to a 2G or 3G cell. UE 102 may in turn transition from the LTE cell to a 2G or 3G cell using circuit switched fallback. According to some aspects, UE 102 may transition from NR RAT to LTE E-UTRAT using an EPS fallback procedure when NR cell does not support voice services. EPS fallback may occur when UE 102 indicates to the IP multimedia subsystem (IMS) that it wishes to initiate a voice call, and UE 102 is directed to transition from NR towards LTE UTRAN. A new radio connection may be started for a voice over LTE (VoLTE) call. According to some aspects, UE 102 may subsequently transition to a 2G or 3G RAT using circuit switched fallback.

According to some aspects, when the core network supports voice services but NR RAT does not, UE 102 may transition from NR RAT to LTE E-UTRAT using a RAT fallback procedure. RAT fallback may occur when UE 102 indicates to the IMS that it wishes to initiate a voice call, and UE 102 is directed to transition from NR towards LTE, using both the E-UTRAN and EPC for Packet Data Network Connectivity. According to some aspects, UE 102 may subsequently transition to a 2G or 3G RAT using circuit switched fallback. After the circuit switched call, UE 102 may stay in GSM/UMTS RAT until a cell reselection is triggered.

Another exemplary scenario of how UE 102 may move from an NR cell to a 2G or 3G cell is when the NR cell becomes temporally unavailable to UE 102 due to signal attenuation. For example, UE 102 may lose service from NR cell when the UE passes through the tunnel or when the UE enters an elevator, or when the UE experiences some signal blocking obstruction. Once UE 102 exits a tunnel after passing through the tunnel or when the UE exits an elevator, or when the UE clears some other signal blocking obstruction, UE may get back into service on a 2G or 3G cell. UE 102 may remain in GSM/UMTS RAT until cell reselection is triggered.

Another exemplary scenario of how UE 102 may move from an NR cell to a 2G or 3G cell is when a power saving feature such as a Smart DATA Mode Feature is enabled at UE 102. According to some aspects, when UE 102 is in a power save mode, it may be restricted to a lower power consumption RAT like LTE RAT. Further, UE 102 in a power save mode may be restricted to a lower power consumption RAT such as UTRAN or GSM. When UE 102 is in a power save mode, it may transition from LTE RAT to 2G or 3G RAT. On exiting the Smart DATA Mode Feature, UE 102 may remain in 2G or 3G RAT. UE 102 may remain in GSM/UMTS RAT until a cell reselection is triggered.

Another exemplary scenario of how UE 102 may move from an NR cell to a 2G or 3G cell is when UE 102 supports single radio voice call continuity (SRVCC) feature. According to some aspects, when UE 102 supports SRVCC, a VoNR call can be transferred from NR RAT to 3G RAT. According to some aspects, to provide continuity of a voice call, SRVCC enables transition of UE 102 from NG-RAN to UTRAN as defined in TS 23.216. Further, on completion of the call, UE 102 may stay in GSM/UMTS RAT until cell reselection is triggered.

At 406, UE 102 is camped on a cell of a 2G or 3G RAT. According to some aspects, UE 102 that is camped on a cell of a 2G or 3G RAT monitors whether one or more trigger conditions are met in order to initiate an access stratum based cell reselection procedure for prioritized return to NR RAT. The trigger conditions described as follows. According to some aspects, UE 102 may initiate a cell reselection procedure for prioritized return to NR RAT once UE enters an idle mode. According to some aspects, in response to a determination that the PLMN selected when the UE is camped on 2G or 3G RAT is the same as the last-serving PLMN, UE 102 may initiate a procedure for prioritized return to NR RAT. According to some aspects, in response to a determination that the PLMN selected when the UE is camped on 2G or 3G RAT is an equivalent PLMN of last-serving PLMN, UE 102 may initiate a procedure for prioritized return to NR RAT.

According to some aspects, UE 102 may initiate a procedure for prioritized return to NR RAT only when NR RAT is the highest priority RAT of the UE for cell reselection. According to some aspects, UE 102 may not initiate a reselection based prioritized return to NR RAT procedure when LTE RAT is the highest priority RAT of the UE for cell reselection. According to some aspects, UE 102 in idle mode performs measurements for cell reselection towards RATs that are assigned a higher priority.

Still at 406, UE 102 monitors trigger conditions corresponding to prioritized return to an NR RAT, and on determining that one or more trigger conditions are met, NAS may generate an action trigger request to initiate measurements on NR frequencies stored in the measurement database.

According to some aspects, UE 102, when camped on a GSM cell, can access the measurement database and initiate signal quality measurements over NR frequencies stored in the database. On receiving an action trigger request from NAS, GSM radio resource control (RRC) can configure previously stored NR frequencies measurement from the measurement database. UE 102 obtains measurement configuration parameters for executing cell reselection from the measurement database. According to some aspects, GSM RRC may only consider NR frequencies that have a higher priority than the camped serving cell frequency.

According to some aspects, UE 102 when camped on a GSM cell, performs signal quality measurements corresponding to the stored list of NR frequencies. GSM RRC can calculate values of Srxlev, Squal of a target NR Cell using measurements from the physical layer and the cell reselection parameters stored in the measurement database 256. According to some aspects, the value of parameter Srxlev depends on the synchronization signal reference signal received signal power (RSRP) of target NR cell measured by UE 102. According to some aspects, the value of parameter Squal depends on the synchronization signal reference signal received quality (RSRQ) of target NR cell measured by UE 102. GSM RRC may activate measurements on NR frequencies for a predefined duration T_measure_NR_Freq.

According to some aspects, UE 102, when camped on a UMTS cell, can access the measurement database 256 and initiate signal quality measurements over NR frequencies stored in the database. On receiving an action trigger request from NAS, UMTS RRC can configure previously stored NR frequencies measurement from the measurement database 256. UE 102 obtains measurement configuration parameters for executing cell reselection from the measurement database 256. According to some aspects, UMTS RRC may only consider NR frequencies that have a higher priority than the camped UMTS cell frequency.

According to some aspects, UE 102, when camped on a GMS cell performs signal quality measurements corresponding to the stored list of NR frequencies. UMTS RRC can calculate values of Srxlev, Squal of a target NR Cell using measurements from the physical layer and the parameters stored in the measurement database 256. UMTS RRC may activate measurements on NR frequencies for a predefined duration T_measure_NR_Freq. The measurement duration T_measure_NR_Freq is configurable and may depend on network conditions.

At 408, UE 102 performs a cell reselection from a cell of a 2G or 3G RAT to a cell of NR RAT. UE 102 moves to NR RAT when one or more cell reselection criteria are satisfied. According to some aspects, GSM RRC can evaluate cell reselection criteria for a target NR Cell based on RSRP measurements and RSRQ measurements. When Srxlev and Squal values (respectively based on RSRP and RSRQ measurements) of a target NR cell satisfy a cell selection criteria, GSM RRC triggers reselection to the target NR cell. When Srxlev and Squal values of a target NR cell satisfy the following criteria: Srxlev>0 and Squal>0, and Srxlev>threshXhighP and Squal>threshXhighQ, UE 102 moves from the GSM cell to the target NR cell. According to some aspects, reselection to NR RAT is performed when cell reselection criteria are satisfied at least for a time duration specified by a reselection timer.

According to some aspects, UMTS RRC can evaluate cell reselection criteria for a target NR Cell based on RSRP measurements or RSRQ measurements. When Srxlev and Squal values of a target NR cell satisfies a cell selection criteria, UMTS RRC triggers reselection to the target NR cell. A Srxlev and Squal values of a target NR cell satisfy the following criteria: Srxlev>0 and Squal>0, and Srxlev>threshXhighP and Squal>threshXhighQ, UE 102 moves from the UMTS cell to the target NR cell. According to some aspects, reselection to NR RAT is performed when cell reselection criteria are satisfied at least for a time duration specified by a reselection timer. According to some aspects, the duration of the reselection timer is configurable and can be stored in the measurement database.

At 410, UE 102 returns to NR RAT and is camped on a cell of NR RAT. According to some aspects, UE 102 may return a cell of NR base station 104 or a cell of another NR base station of the same or equivalent PLMN.

FIG. 5 illustrates an exemplary method 500 performed by a UE implementing prioritized return to NR RAT from a 2G/3G RAT, according to some aspects of this disclosure. As a convenience and not a limitation, FIG. 5 may be described with regard to elements of FIGS. 1-4. Method 500 may represent the operation of UE 102 of FIG. 4 prioritized return to NR RAT from a 2G/3G RAT. Method 500 may also be performed by system 200 of FIG. 2 and/or computer system 600 of FIG. 6. But method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, UE 102 determines whether the UE is camped on a first radio access technology (RAT). According to some aspects, the first RAT is a NR RAT. When UE 102 camps on a cell of NR base station 104 and receives system information block (SIB) broadcasts from the base station.

At 504, in response to a determination that the UE is camped on the first RAT, UE 102 stores a list of frequencies and a plurality of cell reselection parameter values corresponding to the first RAT. According to some aspects, UE 102 stores the system information it receives from NR base station 104 in a measurement database 256. According to some aspects, UE 102 may populate the measurement database 256 based on a determination that it is camped on a cell of NR RAT. According to some aspects, UE 102 may store its measurement database in a local memory (e.g., in memory 250 of UE 102). According to some aspects, the measurement database of UE 102 may be stored at a remote location (e.g., a remote server).

According to some aspects, information stored in the measurement database 256 may include a list InterFreqCarrierFreqList that provides up to eight InterFreqCarrierFreqInfo information element sets. Each InterFreqCarrierFreqInfo information element set contains neighboring carrier frequencies and frequency specific cell reselection information. The measurement database 256 may include an information element (IE) dl-CarrierFreq, which specifics the Absolute Frequency Channel Number (ARFCN) for the SS/PBCH of the inter-frequency neighbor cells. The measurement database 256 may include an IE frequencyBandList, which indicates a list of frequency bands for which the NR cell re-selection parameters apply.

According to some aspects, the measurement database 256 may include an IE Q-RxLevMin which defines the minimum RSRP requirement for a target NR cell for reselection. The measurement database may include an IE q-QualMin that defines the minimum RSQR requirement for the target NR cell. According to some aspects, information stored in the measurement database 256 may include an IEs threshX-HighP and threshX-HighQ which are applicable during cell reselection from 2G/3G RAT to NR RAT.

At 506, UE 102 determines whether the UE is camped on a second RAT and whether one of a plurality of trigger conditions is satisfied. According to some aspects, the second RAT is 3G RAT (e.g., UMTS RAT) or a 2G RAT (e.g., GSM RAT). According to some aspects, UE 102 moves from an NR RAT to a 2G RAT or 3G RAT. For example, UE 102 may transition from NR RAT to LTE E-UTRAT using an EPS fallback procedure, and may subsequently transition to a 2G or 3G RAT using circuit switched fallback procedure.

According to some aspects, UE 102 that is camped on a cell of a 2G or 3G RAT monitors whether one or more trigger conditions are met in order to initiate an access stratum based cell reselection procedure for prioritized return to NR RAT. According to some aspects, UE 102 may determine that a trigger condition is met once UE enters an idle mode. According to some aspects, in response to a determination that the PLMN selected when the UE is camped on 2G or 3G RAT is same as the last-serving PLMN, UE 102 may determine that a trigger condition is met and initiate a procedure for prioritized return to NR RAT.

According to some aspects, in response to a determination that the PLMN selected when the UE is camped on 2G or 3G RAT is an equivalent PLMN of last-serving PLMN, UE 102 may determine that a trigger condition is met and may initiate the procedure for prioritized return to NR RAT.

According to some aspects, UE 102 may determine that a trigger condition is met and initiate a procedure for prioritized return to NR RAT only when NR RAT is the highest priority RAT of the UE for cell reselection. According to some aspects, UE 102 may not initiate a reselection based prioritized return to NR RAT procedure when LTE RAT is the highest priority RAT of the UE for cell reselection. According to some aspects, UE 102 in idle mode performs measurements for cell reselection towards RATs that are assigned a higher priority. According to some aspects, UE 102 may initiate the procedure for prioritized return to NR RAT when two or more trigger conditions are met. According to some aspects, UE 102 may initiate the procedure for prioritized return to NR RAT when a set of trigger conditions are met.

At 508, in response to a determination that the UE is camped on the second RAT and that one of the plurality of trigger conditions is satisfied, UE 102 performs measurements on one or more frequencies of the list of frequencies. When UE 102 camps on a GMS cell, it performs signal quality measurements corresponding to the stored list of NR frequencies. GSM RRC can calculate values of Srxlev, Squal of a target NR Cell using measurements from the physical layer and the parameters stored on the measurement database 256. According to some aspects, the value of parameter Srxlev depends on the synchronization signal reference signal received signal power (RSRP) of the target NR cell measured by UE 102. According to some aspects, the value of parameter Squal depends on the synchronization signal reference signal received quality (RSRQ) of the target NR cell measured by UE 102. According to some aspects, UE 102 when camped on a GSM cell performs signal quality measurements corresponding to the stored list of NR frequencies. UMTS RRC can calculate values of Srxlev, Squal of a target NR Cell using measurements from the physical layer and the parameters stored on the measurement database 256. GSM RRC and UMTS RRC may activate measurements on NR frequencies for a predefined measurement duration that is configurable based on a quality of service requirement.

At 510, UE 102 performs cell reselection to a cell of the first RAT based at least in part on the measurements and the plurality of cell reselection parameter values.

Figure 6:
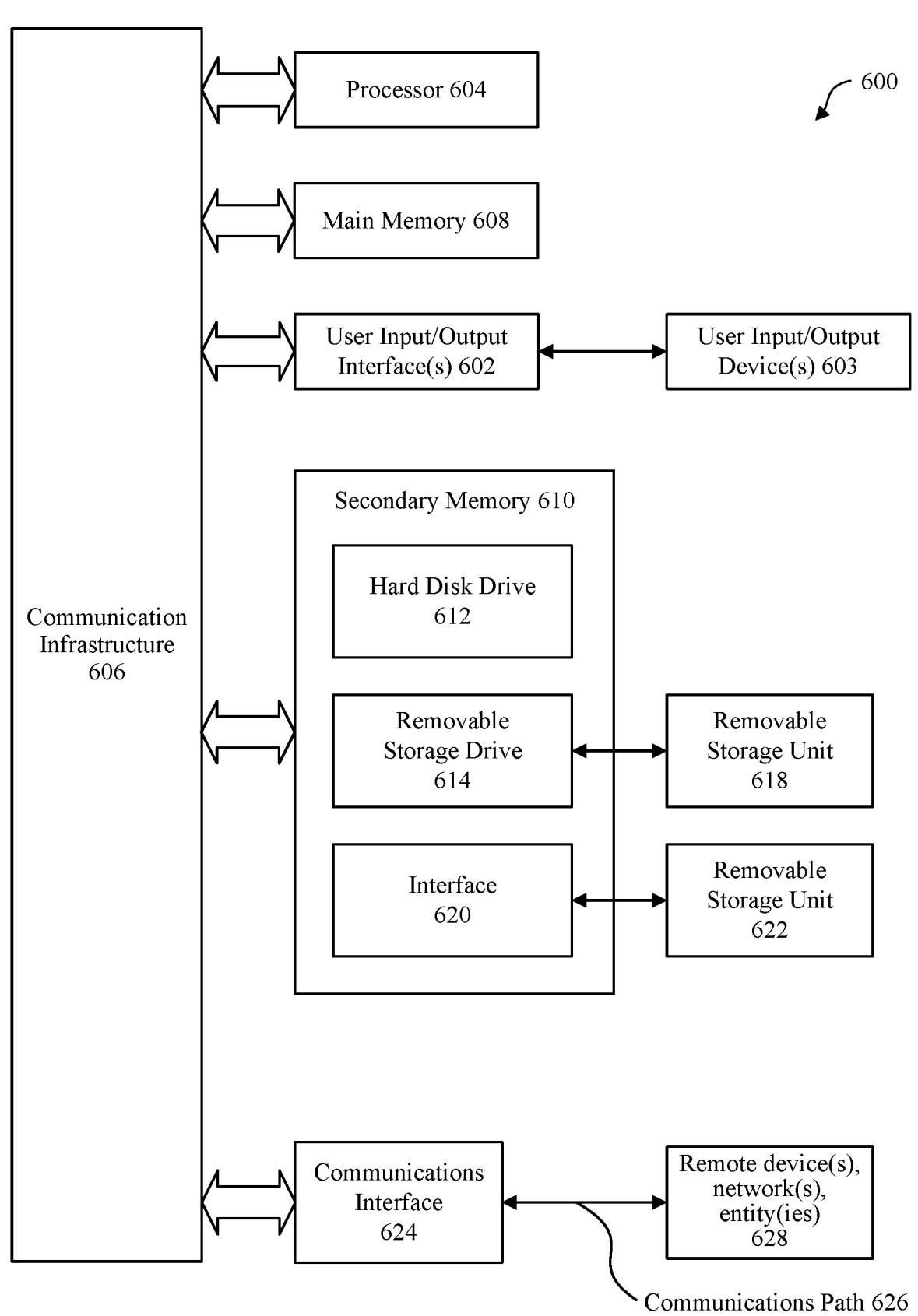
FIG. 6 is an example computer system for implementing some aspects or portion(s) thereof.

Various aspects can be implemented, for example, using one or more computer systems, such as computer system 600 shown in FIG. 6. Computer system 600 can be any well-known computer capable of performing the functions described herein such as UE 102 of FIG. 1. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Account-ability Act (HIPAA); whereas health data in other countries may be subject to other regulations and policies and should be handled accordingly. Hence different privacy practices should be maintained for different personal data types in each country.

What is claimed is:

1. An apparatus, comprising:
   a memory; and
   a processor, coupled to the memory, and configured to:
   determine whether a user equipment (UE) is camped on a first radio access technology (RAT);
   in response to a determination that the UE is camped on the first RAT and while the UE is camped on the first RAT, store a list of frequencies and a plurality of cell reselection parameter values corresponding to the first RAT;
   determine whether the UE is camped on a second RAT and whether one of a plurality of trigger conditions is satisfied;
   in response to a determination that the UE is camped on the second RAT and that one of the plurality of trigger conditions is satisfied, perform measurements on one or more frequencies of the list of frequencies; and
   perform cell reselection to a cell of the first RAT based at least in part on the measurements and the plurality of cell reselection parameter values.

2. The apparatus of claim 1, wherein the processor is further configured to:
   store an identity of a last-serving public land mobile network (PLMN) when the UE is camped on the first RAT;
   determine whether a PLMN selected when the UE is camped on the second RAT is the same as the last-serving PLMN; and
   in response to a determination that the PLMN selected when the UE is camped on the second RAT is the same as the last-serving PLMN, determine that a trigger condition of the plurality of trigger conditions is satis-fied.

3. The apparatus of claim 1, wherein the processor is further configured to:
   determine whether a PLMN selected when the UE is camped on the second RAT is an equivalent PLMN of the last-serving PLMN; and
   in response to a determination that the PLMN selected when the UE is camped on the second RAT is an equivalent PLMN of the last-serving PLMN, determine that a trigger condition of the plurality of trigger conditions is satisfied.

4. The apparatus of claim 1, wherein the processor is further configured to:
   determine whether the first RAT is a highest priority RAT of the UE for cell reselection; and
   in response to a determination that the first RAT is the highest priority RAT of the UE for cell reselection, determine that a trigger condition of the plurality of trigger conditions is satisfied.

5. The apparatus of claim 1, wherein, in response to the determination that the UE is camped on the first RAT, the processor is further configured to:
   store, in a database, information received in one or more of a system information block (SIB) 1, a SIB 2, and a SIB 4.

6. The apparatus of claim 5, wherein one or more of the following are stored in the database: a list of PLMN iden-tities, the list of frequencies, or the plurality of cell reselec-tion parameter values.

7. The apparatus of claim 5, wherein the processor is further configured to:
   in response to the determination that the UE is camped on the second RAT and one of the plurality of trigger conditions is satisfied, access the stored list of frequen-cies from the database using a non-access stratum (NAS) layer function of the UE; and
   perform, using a physical layer function of the UE, the measurements on the one or more frequencies of the stored list of frequencies.

8. The apparatus of claim 1, wherein the processor is further configured to:
   determine whether a frequency of the stored list of frequencies satisfies a cell reselection criterion, wherein the frequency of the stored list of frequencies corresponds to the cell of the first RAT; and
   in response to a determination that the frequency of the stored list of frequencies satisfies the cell reselection criterion, perform cell reselection to the cell of the first RAT, using a radio resource control (RRC) layer func-tion of the UE corresponding to the second RAT.

9. The apparatus of claim 1, wherein the first RAT is a New Radio (NR).

10. The apparatus of claim 1, wherein the second RAT is a universal mobile telecommunications system (UMTS) RAT or a global system for mobile communications (GSM) RAT.

11. A method performed by a user equipment (UE), comprising:
   determining whether the UE is camped on a first radio access technology (RAT);
   in response to a determination that the UE is camped on the first RAT and while the UE is camped on the first RAT, storing a list of frequencies and a plurality of cell reselection parameter values corresponding to the first RAT;
   determining whether the UE is camped on a second RAT and whether one of a plurality of trigger conditions is satisfied;
   in response to a determination that the UE is camped on the second RAT and one of the plurality of trigger conditions is satisfied, performing measurements on one or more frequencies of the list of frequencies; and
   performing cell reselection to a cell of the first RAT based at least in part on the measurements and the plurality of cell reselection parameter values.

12. The method of claim 11, further comprising:
   storing an identity of a last-serving public land mobile network (PLMN) when the UE is camped on the first RAT;
   determining whether a PLMN selected when the UE is camped on the second RAT is the same as the last-serving PLMN; and
   in response to a determination that the PLMN selected when the UE is camped on the second RAT is the same as the last-serving PLMN, determining that a trigger condition of the plurality of trigger conditions is satis-fied.

13. The method of claim 11, further comprising:
   determining whether the first RAT is a highest priority RAT of the UE for cell reselection; and
   in response to a determination that the first RAT is the highest priority RAT of the UE for cell reselection, determining that a trigger condition of the plurality of trigger conditions is satisfied.

14. The method of claim 11, further comprising:

in response to the determination that the UE is camped on the first RAT, storing, in a database, information received in one or more of the following: a system block (SIB) 1, a SIB 2, and a SIB 4.

15. The method of claim 14, further comprising:

in response to the determination that the UE is camped on the second RAT and one of the plurality of trigger conditions is satisfied, accessing the stored list of frequencies from the database using a non-access stratum (NAS) layer function of the UE; and performing, using a physical layer function of the UE, the measurements on the one or more frequencies of the stored list of frequencies.

16. The method of claim 11, further comprising:

determining whether a frequency of the stored list of frequencies satisfies a cell reselection criterion, wherein the frequency of the stored list of frequencies corresponds to the cell of the first RAT; and in response to a determination that the frequency of the stored list of frequencies satisfies the cell reselection criterion, performing cell reselection to the cell of the first RAT, using a radio resource control (RRC) layer function of the UE corresponding to the second RAT.

17. The method of claim 11, wherein the first RAT is a New Radio (NR).

18. The method of claim 11, wherein the second RAT is a universal mobile telecommunications system (UMTS) RAT or a global system for mobile communications (GSM) RAT.

19. A non-transitory computer-readable medium (CRM) having instructions stored thereon that, when executed by a processor of a user equipment (UE), causes the UE to perform operations comprising:

determining whether the UE is camped on a first radio access technology (RAT);

in response to a determination that the UE is camped on the first RAT and while the UE is camped on the first RAT, storing a list of frequencies and a plurality of cell reselection parameter values corresponding to the first RAT;

determining whether the UE is camped on a second RAT and whether one of a plurality of trigger conditions is satisfied;

in response to a determination that the UE is camped on the second RAT and that one of the plurality of trigger conditions is satisfied, performing measurements on one or more frequencies of the list of frequencies; and performing cell reselection to a cell of the first RAT based at least in part on the measurements and the plurality of cell reselection parameter values.

20. The non-transitory CRM of claim 19, the operations further comprising:

in response to the determination that the UE is camped on the first RAT, storing, in a database, information received in one or more of the following: a system information block (SIB) 1, a SIB 2, and a SIB 4.

* * * * *